Sept. 29, 1970 M. A. SLOATE 3,531,776

MEANS FOR SYNCHRONIZING EQUAL BUT UNSYNCHRONIZED FRAME RATES OF RECEIVED SIGNAL AND RECEIVER

Filed Oct. 9, 1967

INVENTOR.
MARK A. SLOATE
BY Donald W. Phillips
ATTORNEY

United States Patent Office 3,531,776

Patented Sept. 29, 1970

3,531,776

MEANS FOR SYNCHRONIZING EQUAL BUT UNSYNCHRONIZED FRAME RATES OF RECEIVED SIGNAL AND RECEIVER

Mark A. Sloate, Costa Mesa, Calif., assignor to Collins Radio Company, Cedar Rapids, Iowa, a corporation of Iowa Filed Oct. 9, 1967, Ser. No. 673,903
Int. Cl. H04j *3/06*
U.S. Cl. 340—172.5 2 Claims

ABSTRACT OF THE DISCLOSURE

Means for synchronizing the frame rates of a received signal and the receiver when both frame and bit rates are equal, comprising shift register means to which are supplied the received data bits. A counter counts the number of bits received in each frame. A matrix, including storage means, responds to each receiver frame synchronizing pulse to momentarily become connected to the counter output to store therein the count existing at that moment and to establish a path through said matrix from the corresponding shift register stage to the output of the matrix. Logic means at the matrix output responds to each receiver bit synchronizing pulse to supply the bit stored in said stage to a utilization means. Since the bit rates of the received signal and receiver are equal, successive bits of any given frame will be advanced to the addressed shift register stage alternately with the receiver bit synchronizing pulses.

This invention relates generally to means for interfacing a received, time synchronous, data encoded signal with the fixed timing of a receiver, and more specifically to a means for effectively shifting the frames of the received time synchronous signal to coincide with the frame timing of the receiver, where both the frame rate and the bit rate of the received signal are the same as the frame rate and the bit rate of the receiver but wherein the frame rates are not in synchronism.

In the transmission of data to a receiver, two distinct problems of synchronization are likely to occur. The first problem relates to frame synchronization. More specifically, in some data processing or data transmission system two separately located elements of the system have equal data bit rates and frame rates. However, due to various causes, such as propagation delay for example, the frame rate of signals transmitted from one of these elements to another is not in synchronization with the frame rate of the receiver element. The second problem involves bit synchronization. In some data transmission systems the bit rate of the receiver is different from the bit rate of the transmitted words. In those cases where the bit rate at the receiver is lower than the transmitted bit rate, it is possible to transmit with a time gap between the words so that the frame rate of the transmitted words is equal to the frame rate of the receiver. The transmitted word can then be re-formed with a new bit rate equal to the bit rate of the receiver. A third problem can arise when both the frame synchronization and the bit synchronization of the received transmitted word are unsuitable for direct reception by the receiver.

In the prior art the above-mentioned problems of synchronizing the frame and bit rate of the received signal to those of the receiver is usually accomplished by some type of buffer storage. A common type of buffer storage involves the use of magnetic cores with a plurality of address locations therein. The received words are stored in the various address locations of the magnetic core buffer storage means, and then at the appropriate time, both with respect to frame synchronization and bit synchronization, are retransmitted to the receiver, which may be a data processing equipment. Other types of buffer storage memories include circulating memories which can receive information from peripheral devices, such as Teletype machines, at a relatively slow rate and then periodically deliver the Teletype codes to a data processor at the much faster bit rate of the data processor, and with the proper frame synchronization. Reference is made to co-pending U.S. application, Ser. No. 434,964, now Pat. 3,350,697, filed Feb. 24, 1965, by Robert J. Hirvela and entitled "TTY Character Assembler," and co-pending U.S. application, Ser. No. 519,732, now Pat. 3,432,816, filed Jan. 10, 1966, by Melvin M. Hutchinson and William J. Melvin and entitled "Glass Delay Line Recirculating Memory," for a more complete description of this type buffer storage memory.

The above-mentioned prior art devices have proven quite satisfactory in handling incoming data and outgoing data with respect to frame and bit synchronization and, further, are capable of effecting intermediate storage of data over relativley long periods of time. More specifically, they not only are able to handle buffer storage requirements involving relatively short time intervals, not exceeding a frame length, but are also capable of handling rather large time differences between the frame and bit times of peripheral devices, such as a teletypewriter machine for example, and the frame and bit times of a data processor, for example. Such prior art devices are, however, quite expensive and relatively complex. There is a need in the prior art for a buffer storage device of a somewhat lesser capacity which is capable of handling frame and bit synchronization problems between the received transmitted data and the receiver, when the differences in synchronization are relatively small as, for example, those frame synchronization problems arising from propagation delay of the words, and those problems involved in adapting unequal bit rates when it is feasible to cause the frame rates of the transmitter and receiver to be equal.

A relatively small capacity buffer storage device for adapting the bit rate of a received transmitted signal to the bit rate of the receiver when the two bit rates are unequal but when the frame rate of the received transmitted signal and the receiver are the same and are synchronous is described in co-pending application, Ser. No. 673,664, entitled "Means for Adapting a Transmitted Signal to a Receiver With Synchronized Frame Rates but Unequal Bit Rates" and filed Oct. 9, 1957, by Mark A. Sloate concurrently herewith. A second structure employing a relatively small capacity buffer storage means and adapted to interface a received transmitted signal whose frame rate is equal to, but nonsynchronous with the frame rate of the receiver, and whose bit rate is unequal to the bit rate of the receiver, is disclosed in co-pending application, Ser. No. 673,669, entitled "Means for Sychronizing Frame and Bit Rates of a Received Signal With a Receiver" filed Oct. 9, 1967 by Mark A. Sloate.

It is a primary object of this invention to provide a means operable to maintain frame synchronization between received data and the receiver by inserting a variable delay between the received information and said receiver, which delay means automatically adjusts itself to compensate for varying propagation delay.

It is a second object of the invention to provide a means for synchronizing the frame rate of a received signal with the frame rate of the receiver when the bit rates of the received signal and the receiver are equal.

A third object of the invention is a simplified and relatively inexpensive means for maintaining effective frame synchronization between a received transmitted signal and the receiver.

A fourth purpose of the invention is a simplified and reliable means employing a shift register for effectively maintaining frame synchronization between a received transmitted signal and the receiver when the amount of frame displacement between the two signals is less than one frame period.

Another object of the invention is the improvement of buffer storage synchronizing means generally.

In accordance with the invention, the data is transmitted in frames at its frame rate $f_s$, with each frame containing N bits. At the receiver the frame synchronizing signal is extracted from the received signal and utilized to energize the counter (reset to zero) which will thereafter increment its count by one for each bit received during said frame. The received bits are also supplied into a shift register so that the count contained in the counter during any given frame will indicate the stage into which the first bit of the received word has been advanced. A matrix is provided which is constructed to respond to and store the count in the counter and to connect the stage of said shift register corresponding to said count to an output circuit. The said output circuit includes gating means which remain closed, that is nonconductive, until such time as the receiver is ready to receive the frame currently being stored in the shift register. At such time the gating means becomes conductive, thereby permitting the bit stored in the shift register stage corresponding to the count contained in said counter, to be supplied to the matrix output. For example, if five bits had been entered into the shift register at the time of occurrence of the frame synchronizing pulse of the receiver, the counter would have contained a count of five and would have connected the fifth stage of the shift register to the matrix output circuit, thereby supplying the bit contained in said fifth stage to said matrix output.

Since the bit rate of the received transmitted signal and the receiver are the same, the entry of bits into the fifth stage of the shift register and the occurrence of bit synchronizing pulses at the receiver will occur alternately so that the bits of the frame will always be delivered to the matrix output from the fifth stage of said shift register. Consequently, the output of the counter can be disabled upon the occurrence of the frame synchronizing pulse of the receiver. Thus the counter can be reset to zero at the next received signal frame synchronizing pulse, and can count the bits from the next received frame as said bits are supplied to the shift register.

It is to be noted that the shift register usually, will store bits from two consecutive frames concurrently. More specifically, while the last bits of one frame are being supplied from the shift register through the matrix to the matrix output, the first bits of the next subsequent frame are being entered into the shift register. Thus the counter must be released from controlling the matrix before all bits of one frame have been supplied to the matrix output in order to count the bits of the next received frame.

The above-mentioned and other objects and features of the invention will be more fully understood from the following detailed description thereof when read in conjunction with the drawings in which.

Figure 1:
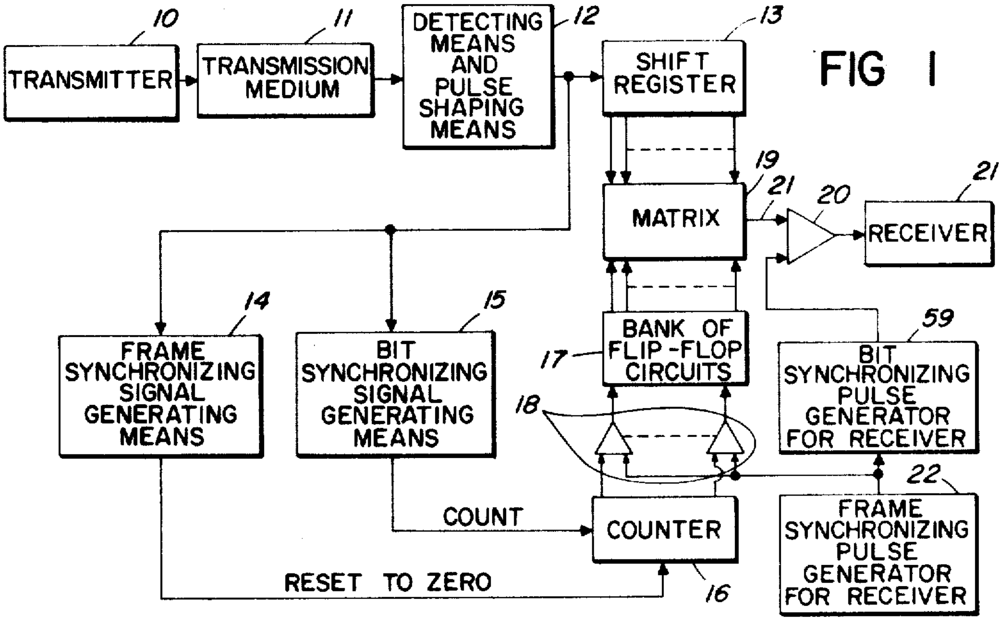
FIG. 1 is a block diagram of the invention.
Figure 2:
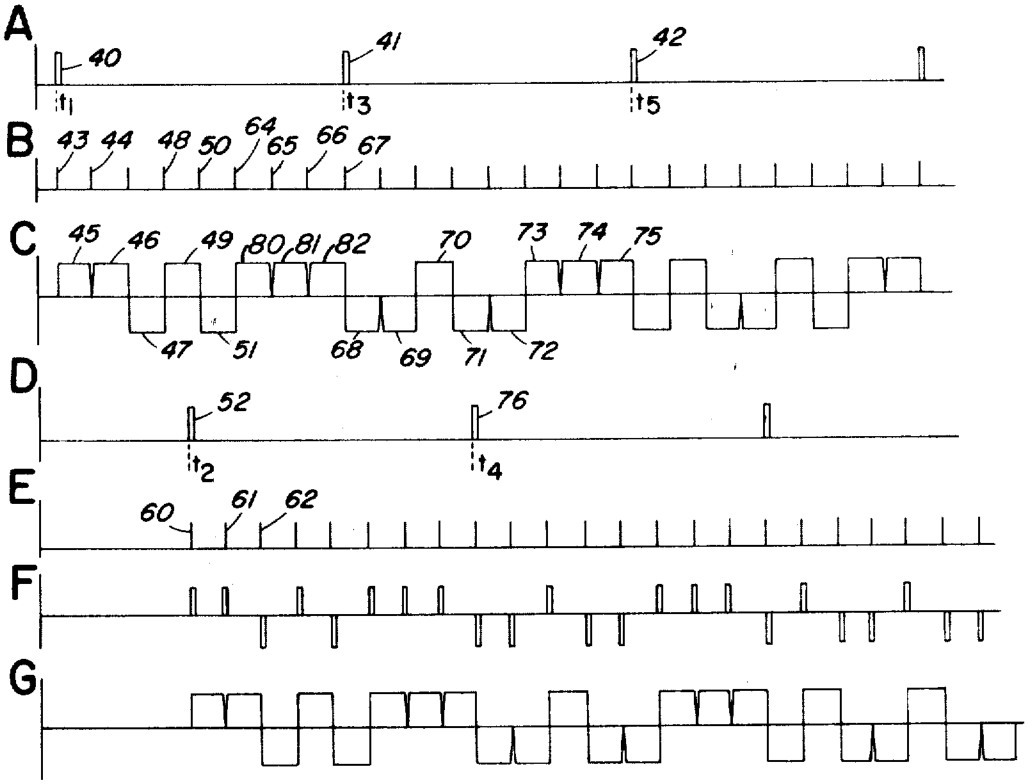
FIG. 2 is a series of waveforms A through G showing the relationship between the frame and bit synchronizing pulses of the received signal and the frame and bit synchronizing pulses of the receiver and how the present invention effectively maintains synchronization between the two frame and bit rates.

Referring now, more specifically, to the waveforms of FIG. 2, there is shown in FIG. 2A the frame synchronizing pulses of the received signal and in FIG. 2D the frame synchronizing pulses of the receiver. It is the time difference between these two frame synchronizing timing signals that must be reconciled by the circuit of FIG. 1.

The transmitter 10 transmits a serial time synchronous data signal through transmission medium 11 to a detecting means and pulse shaper 12 which is located at the receiver site. A serial time synchronous data signal is herein designated as a signal divided into equal and contiguous time intervals. More specifically, each data bit in a time synchronous signal occupies a time interval equal to all of the other time intervals containing data bits in the signal, with all of said time intervals being transmitted contiguously.

While such data bits originally may have been generated as a two-level signal, with one level representing a binary "0" and the other level representing a binary "1," they frequently will be encoded in some suitable manner more readily adapted for transmission. For example, two-level signals can be employed to phase modulate or amplitude modulate a carrier. As a third alternative the binary "1's" and "0's" can be encoded by FSK techniques, i.e. a different frequency for binary "1's" and "0's." The detector 12 functions to detect and shape the received serial signal into the two-level signal shown in the waveform of FIG. 2C. It is to be noted that the waveform of FIG. 2C and also the waveform of FIG. 2G are not represented as true two-level signals but rather are represented as discrete pulses representing binary "1's" or "0's." It is to be understood, however, that the waveforms of FIGS. 2C and 2G are intended to be general and to include both true two-level waveforms as well as the train of two level pulses actually represented. The circuit of FIG. 1 will operate substantially equally well with either a two-level waveform or one comprised of a train of pulses, as will be seen more clearly later herein.

The aforementioned two-level signal is supplied to three different circuits. Firstly, it is supplied to shift register 13 which functions to receive the data in serial form and to advance each received bit one stage in the shift register as each new bit is entered into the shift register. In other words, the shift register 13 functions in the conventional manner of shift registers as it receives the train of data bit pulses. Secondly, the two-level signal is supplied to bit synchronous signal generator 15 which responds thereto to generate therefrom the bit synchronizing signal of FIG. 2B. Thirdly, the said two-level signal is supplied to frame synchronizing generating means 14 which responds thereto to generate the frame synchronizing pulse train of the received transmitted signal, as shown in the waveform of FIG. 2A.

Each frame synchronizing signal from generator 14, such as pulse 40 of FIG. 2A, functions to reset counter 16 to zero. The bit synchronizing pulses of each frame of the received transmitted signal, such as bit synchronizing pulses 43, 44, 48, 50, etc. of FIG. 2B which are generated by means 15, are supplied to counter 16 and function to advance the counter a count of one for each bit synchronizing pulse supplied thereto. It is to be noted that there is one bit synchronizing pulse generated for each bit supplied to shift register 13, which can be seen from FIGS. 2B and 2C. Thus each time a bit is entered into shift register 13, counter 5 is advanced one count. More specifically, when the first bit 45 of FIG. 2C is entered into shift register 13 a corresponding bit synchronizing pulse 43 of FIG. 2B is supplied from bit synchronizing signal generator 15 to counter 16 to advance the count therein from zero to one. When the second bit 46 of FIG. 2C is entered into shift register 13, a corresponding bit synchronizing pulse 44 of FIG. 2B is entered into counter 16 to advance the count therein from one to two.

Assume, for purposes of discussion, that after the fourth bit 49, but before the fifth bit 51, has been entered into shift register 13, the first receiver frame synchronizing pulse 52 of FIG. 2D is generated by receiver frame synchronizing signal source 22. The pulse 52 functions to momentarily enable Inhibit AND gates 18 and thereby connect the output of counter 16 to the bank of flip-flop circuits 17.

The matrix 19 is under control of the bank of flip-flop circuits 17 which in turn is under control of the counter 16. More specifically, when Inhibit AND gate 18 is opened, the count contained in counter 16 is supplied to the bank of flip-flop circuits 17 which responds to store therein the count contained in counter 16 at that time. Said bank of flip-flop circuits 17 can comprise, for example, one flip-flop for each stage of counter 16. Thus if the given stage of the counter 16 contains a binary "0," for example, the corresponding flip-flop of the bank 17 will assume the first of its two stable states. If said given stage of counter 16 contains a binary "1," then the corresponding flip-flop in the bank 17 will assume its second stable state.

Matrix 19 is responsive to the condition of the bank of flip-flop circuits 17 to connect a given stage of the shift register 13 therethrough to the input 21 of AND gate 20. More specifically, if counter 16, for example, contains a count of four then the bank of flip-flop circuits 17 will be caused to store such count and will create a connective path within matrix 19 such that stage four of shift register 13 will be connected through matrix 19 to the input 21 of AND gate 20. Matrices which can perform such switching functions under control of a coded input are very well known in the art and will not be described in detail herein.

Returning again to the operation of the circuit, the frame synchronizing pulse 52 is shown as occurring after four bits have been entered into shift register 13, and counter 16 has counted to four. Said frame synchronizing pulse 52 functions to momentarily connect and then immediately disconnect the counter 16 from the bank of flip-flop circuit 17, which will store the count of counter 16 and will continue to access the fourth stage of the shift register 13 through matrix 19 as long as the received and receiver bit synchronizing pulses are received alternately, as discussed below.

The bit synchronizing signal generating means 15 is constructed to generate the bit synchronizing pulse 60 immediately after the generation of the frame synchronizing pulse 52. Such synchronizing pulse 60 completes the opening of AND gate 20 and permits the bit stored in the fourth stage of shift register 13 to be transmitted through matrix 19, AND gate 20, to receiver 21. Such stored bit is bit 45 of FIG. 2C. Since the bit rate of the received signal is the same as the bit rate of the receiver, an additional incoming bit will be supplied to shift register 13 before the next transfer of a bit from shift register 13 through matrix 19 to receiver 21. Such additional received bit is bit 51 of FIG. 2B which will shift bit 46, previously in the third position of shift register 13, to the fourth position thereof. The next occurring receiver synchronizing bit 61 functions to open AND gate 20 and thereby sample the said second received bit 46 which now occupies the fourth stage of shift register 13. In a similar manner bits 47, 49, 51, 80, 81, and 82 of FIG. 2C will successively occupy the fourth stage position of shift register 13 and will be supplied therefrom through matrix 19, and AND gate 20 to receiver 21.

The samplings of the bits stored in the fourth stage of the shift register 13 are shown in the waveform of FIG. 2F and appear at the output of AND gate 20 of FIG. 1. Such samplings are then supplied to receiver 21 which can be designed to produce either a two-level output signal or a train of two-level data bit pulses, as shown in the waveform of FIG. 2G.

Upon the occurrence of the next frame synchronizing pulse 41 of the received transmitted signal, the counter 16 will be reset to zero and will begin to count the bit synchronizing pulses of the next received frame #2 beginning at time $t_3$. Immediately thereafter the data bits of frame #2, such as bits 68 through 75, will enter into shift register 13 in that order, with counter 16 keeping track of the number of bits entered in preparation for the transfer of the bits of frame #2 from the shift register to the receiver. More specifically, the count in counter 16 will indicate the particular stage to which the first bit 68 of frame #2 has advanced, before any data bits of frame #2 have been transferred from the shift register through the matrix and while the data bits of frame #1 are still being transferred out of the shift register.

For example, it can be seen from FIG. 2 that shift register 13, during time interval $t_3$–$t_4$, has bits from frame #2 entering into the front end thereof and bits from frame #1 being delivered from stage four thereof to receiver 21 through matrix 19.

At time $t_4$ a second receiver framing pulse 76 (FIG. 2D) is generated by pulse generator 59 which functions to momentarily open Inhibit AND gates 18 and store the count contained in counter 16 in the bank of flip-flop circuits 17. In response to said stored count the matrix 19 again connects the fourth stage of shift register 13 through matrix 19 and AND gate 20 to receiver 21. It is to be specifically noted that AND gate 20 is opened only in response to a receiver bit synchronizing pulse from generating source 59, as for example, bits 60, 61, and 62 of FIG. 2E.

Thus as each frame is received from the transmitter the counter 16 counts the bits as they are entered into shift register 13 and then, upon the occurrence of a frame synchronizing pulse from receiver generator 59, supplies said count to the bank of flip-flop circuits 17, thereby addressing the particular stage of the shift register to which the first bit of the frame being received has advanced. Subsequent receiver bit synchronizing pulses will function to transfer data bits from the addressed stage of shift register 13 through matrix 19, AND gate 20, and into receiver 21. In the particular example discussed herein the particular stage of shift register 13 addressed is the fourth stage. Such addressed stage, however, could be the fifth, sixth, seventh, or any other stage of shift register 13, depending upon the time of occurrence of the receiver frame synchronizing pulses.

It is to be understood that the form of the invention shown and described herein is but a preferred embodiment thereof and that various changes may be made in the details of the logic diagram without departing from the spirit or scope of the invention.

I claim:

1. Means for synchronizing the frame synchronizing pulses of a received signal with the frame synchronizing pulses of a receiver when the frame rates and the bit rates of the received signal and the receiver are the same, and comprising:

receiving means for receiving and reshaping said received signal into a serial two-level signal with N data bits in each frame;

shift register means having a plurality of stages and constructed to receive said serial two-level signal, with each data bit being advanced in said shift register means as another data bit is entered therein;

first synchronizing signal detecting means responsive to said two-level serial signal to produce a train of first frame synchronizing pulses marking the frame divisions thereof;

second synchronizing signal detecting means responsive to said two-level serial signal to produce a train of first bit synchronizing pulses marking the bit divisions thereof;

second frame synchronizing pulse generating means for generating the frame synchronizing pulses of said receiver;

counter means constructed to respond to each of said train of first frame synchronizing pulses to begin counting, from a predetermined count, each subsequent bit synchronizing pulse, and further constructed to produce an output signal indicative of the count contained therein;

switching means comprising matrix means having input and output means and responsive to said output signal of said counter means when supplied thereto, to store said count therein and to connect to said output means the Mth stage of said shift register means, where M is the number of subsequent bit synchronizing pulses supplied to said counter means; and gating means responsive to the frame synchronizing pulses of said receiver to connect the output of said counter means to said switching means to transfer the count contained in said counter means to said switching means.

2. Means for synchroniznig at a receiver, the frames of a received serial type signal, comprised of data bits and frames, with the frames of the receiver, when the frame bit rates of the receiver are the same as those of the received signal, and comprising:

shift register means having a plurality of stages and constructed to receive said signal;

first and second detecting means constructed to respond to the received serial type signal to generate first frame and bit synchronizing signals identifying the frame and bit transition times of said received serial type signal;

counting means responsive to each of said frame synchronizing pulses and to the subsequent bit synchronizing signals to count the number of bits as they are received by said shift register means, and to generate an output signal representative of the count contained therein;

means for generating the frame synchronizing pulses of the receiver;

switching means having input and output means and responsive to each of said receiver frame synchronizing pulses to receive and store the output of said counter means;

said switching means further constructed to respond to said stored output of said counter means to connect to said output means the stage of said shift register means which contains the first data bit supplied to said shift register means after the occurrence of the immediately preceding first frame synchronizing pulse.

References Cited

UNITED STATES PATENTS

| | | | |
|---|---|---|---|
| 3,153,776 | 10/1964 | Schwartz | 340—172.5 |
| 3,261,001 | 7/1966 | Magnin | 340—172.5 |
| 3,431,559 | 3/1969 | Webb | 340—172.5 |

PAUL J. HENON, Primary Examiner

H. E. SPRINGBORN, Assistant Examiner